March 5, 1963 R. VOLES 3,080,116
IMPROVEMENTS RELATING TO COMPUTING DEVICES
Filed Oct. 20, 1958 2 Sheets-Sheet 1

Inventor
R. Voles
By Clarent Downing Seebold
Attys

United States Patent Office 3,080,116
Patented Mar. 5, 1963

3,080,116
IMPROVEMENTS RELATING TO COMPUTING DEVICES
Roger Voles, 6 Clifton Gardens, Chiswick, London W. 4, England
Filed Oct. 20, 1958, Ser. No. 768,302
Claims priority, application Great Britain Oct. 23, 1957
1 Claim. (Cl. 235—180)

This invention relates to a linear programming device that is to say a device which can be used for computing those values of the attributes of a linear function of $m$ attributes or variables which correspond to the maximum value of the function when subject to constraints in the form of, say, $n$ inequality conditions, where $n$ is greater than $m$.

As a mathematical problem, linear programming has been known for a long time and it is a problem which has, for example, arisen in connection with some manufacturing processes, say, the manufacture of oils, where a number of constituents are involved and the qualities of the resultant product must not lie outside a given range of values. In a case such as this the linear function, of which the maximum value is desired, may be the profit. The solution of a problem in linear programming is however usually time consuming, and the object of the present invention is to provide apparatus which, using analogue computing techniques, can solve a linear programming problem relatively rapidly.

According to the present invention there is provided apparatus for maximising a linear function of a set of attributes subject to a set of constraints greater in number than said attributes, comprising a set of magnetisable cores, one core for each attribute, a circuit representing said function and including a source of alternating voltage and inductive couplings with said cores in accordance with the magnitude sign of the constants of said linear function, further circuits representing said constraints and selectively including sources of alternating voltage and inductive couplings with said cores in accordance with the magnitude and sign of constant terms of the respective constraints, each further circuit also including an impedance having a high impedance state for an applied electro-motive force below a predetermined limit and having a low impedance state for an applied electro-motive force above said limit, and means being provided for determining fluxes in said cores corresponding to the maximum voltage across said first source.

Figure 1:
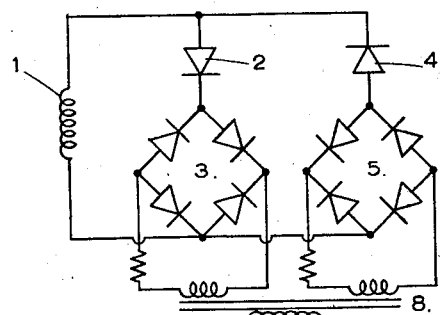
Figure 2:
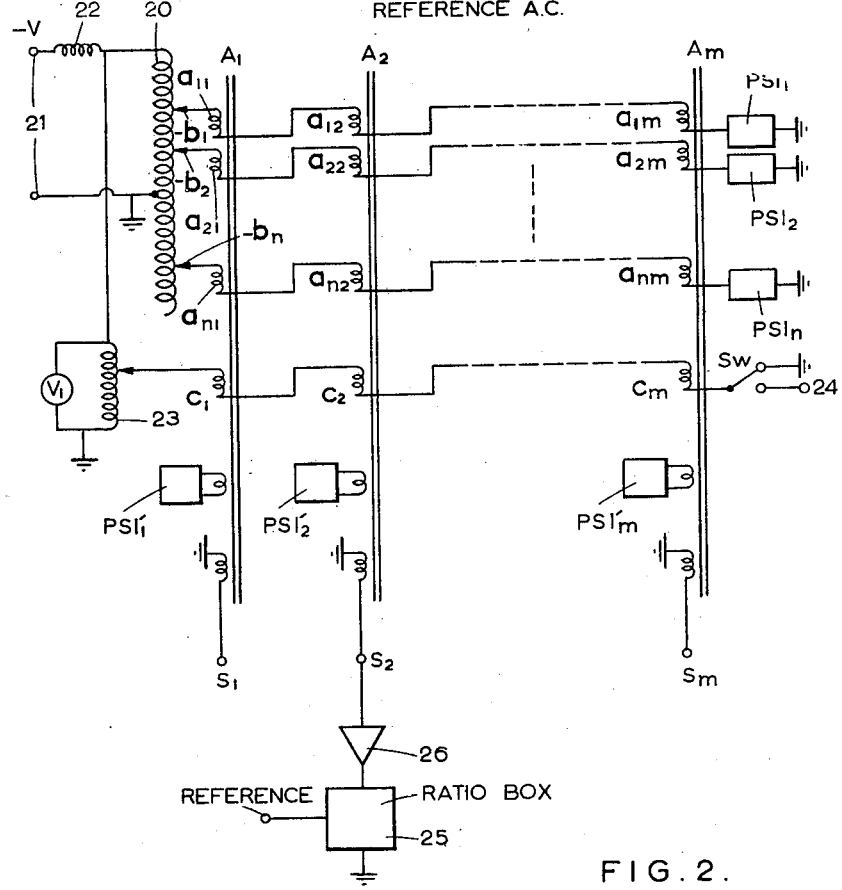
Figure 3:
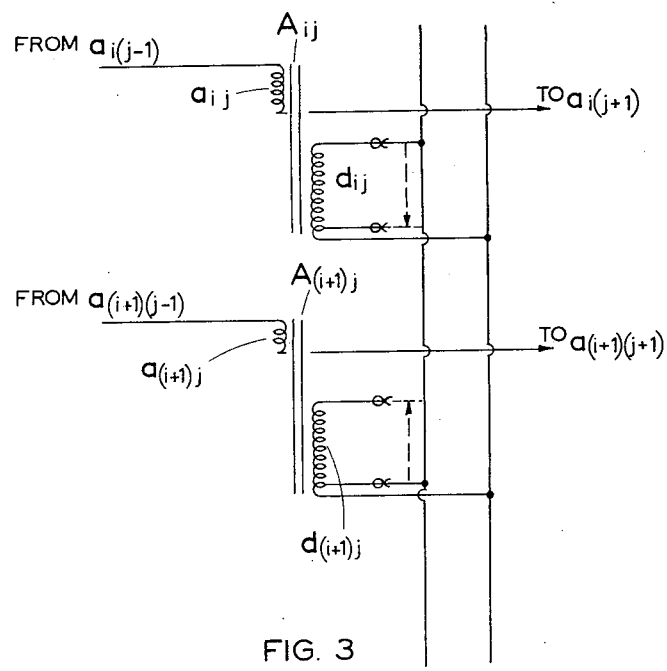

In order that the invention may be clearly understood and readily carried into effect, the invention will be described with reference to the accompanying drawings, in which:

FIGURE 1 illustrates one example of the construction of a phase sensitive device, employed in the linear progamming apparatus illustrated in FIGURE 2, FIGURE 2 illustrates a linear programming apparatus according to one example of the invention, and FIGURE 3 illustrates a modification of FIGURE 2.

The phase sensitive device illustrated in FIGURE 1 is a form of non-linear impedance constructed to have a very high input impedance for one phase of an applied alternating electro-motive force and to have a very low input impedance for the opposite phase. The alternating electro-motive force is applied across the winding 1 which may be assumed to be the secondary winding of a coupling transformer. The winding 1 is connected across the series combination of a diode 2 and a gate 3 on the one hand, and across the series combination of a diode 4 and a gate 5 on the other hand. The gates 3 and 5 are four-diode gates of a known construction and they are opened and closed during alternate half cycles of an alternating voltage of reference phase applied by the transformer 8 from the terminals 6 and 7. When the terminal 6 is positive with respect to the terminal 7, the gate 3 is opened and the gate 5 is closed, and vice versa. Moreover, if the electro-motive force across the winding 1 has the same phase as the reference voltage, the upper end (in the drawing) of the winding 1 is positive with respect to the lower end when the gate 3 is opened so that the diode 2 conducts and, conversely, the upper end of the winding 1 is negative with respect to the lower end when the gate 5 is opened so that the diode 4 conducts. Consequently, having regard to the polarities of the diodes 2 and 4 the impedance connected across the core 1 by the diode arrangement is very low. On the other hand if the electro-motive force across the winding 1 is in phase opposition to that applied at the terminals 6 and 7, the upper end of the winding 1 is negative with respect to the lower end when the gate 3 is opened, and 1 is positive when the gate 5 is opened, consequently the diodes 2 and 4 remain non-conducting and the impedance connected across the core 1 remains virtually infinite.

The impedance of diodes when conducting imposes a limitation, in the case of the device illustrated in FIGURE 1, on the lowest value of impedance obtainable, and if accuracy considerations demand, this impedance may be reduced by using negative feedback techniques in known manner.

Before proceeding to the description of FIGURE 2, a mathematical expression of a linear programming problem is given to facilitate understanding of the present invention.

The constraints in a linear programming problem can be expressed as a set of $n$ inequalities of linear functions of $m$ attributes in which (by a shift of origin if necessary) all the attributes are positive or zero. The number $m$ of the attributes is less than the number $n$ of the constraints. Such a set might be $$a_{11}A_1 + a_{12}A_2 + \ldots + a_{1m}A_m \leq b_1$$
$$a_{21}A_1 + a_{22}A_2 + \ldots + a_{2m}A_m \leq b_2 \qquad (1)$$
$$* \qquad * \qquad * \qquad * \qquad *$$
$$a_{n1}A_1 + a_{n2}A_2 + \ldots + a_{nm}A_m \leq b_n$$

where $A_1, A_2 \ldots$ are the attributes, and $a_{11}, a_{12} \ldots$ and $b_1, b_2 \ldots$ are real constants. Implied in the problem is a linear function of $A_1, A_2 \ldots$ and real constants $c_1, c_2 \ldots$ as follows:

$$c_1A_1 + c_2A_2 + \ldots + c_mA_m = F \qquad (2)$$

Usually F represents profit and must be maximised, but in the event that F is required to be minimised, the same process as for maximisation can be applied by multiplying Equation 2 all through by $-1$ and then maximising $-F$.

In the device shown in FIGURE 2, $m$ transformers are employed, one corresponding to each attribute involved. The transformers have individual cores denoted in the drawing by the references $A_1, A_2 \ldots A_m$; these cores being for example of toroidal form. The cores carry $n$ sets of windings, one for each of the $n$ inequality conditions, and each set of windings comprises $m$ windings connected in series, one winding being arranged on each of the $m$ cores, provided the corresponding constant ($a_{ij}$) is not zero. Assume for example that the top-most set of windings in FIGURE 2 corresponds to the first inequality condition, the number of turns of the winding on the core $A_1$ is proportional to the constant term $a_{11}$ and it is wound in a sense corresponding to the sign of $a_{11}$. Similarly the winding on the core $A_2$ has a number of turns proportional to $a_{12}$ and is wound in the appropriate sense, and so on to the last winding of the series which is denoted in the drawing as $a_{1m}$. Similarly the windings in the next set $a_{21}, a_{22} \ldots a_{2m}$ are proportioned to the constant terms in the second inequality condition expressed by the inequalities 1, and so on through all the sets of winding to that set which corresponds to the last inequality condition which has windings denoted in the drawing as $a_{n1}$, $a_{n2}$ ... $a_{nm}$. One end of each set of windings is connected to an adjustable source of alternating voltage and in setting up the device to solve a given linear programming problem, the respective voltage amplitudes are adjusted to correspond to the constants $b_1$, $b_2$ ... $b_n$ on the scale employed in the device. The voltages are however applied with negative phase (relative to the reference phase for the device), and to achieve this while allowing the taps to be set as though to represent the actual values of $b_1$, $b_2$ ... $b_n$, the adjustable source comprises, in the example illustrated, an auto-transformer 20 which is energised from a source of constant voltage $-V$ applied between the terminals 21, a choke 22 being connected in series with the auto-transformer as shown. The minus sign of V denotes that the phase of the voltage is that to which the negative sign is allotted. The auto-transformer has a negative extension as indicated, allowing for both positive and negative values of the constants $b_1$, $b_2$ and $b_n$. The terminals connected to the auto-transformer 20 are denoted in the drawing by reference $-b_1$, $-b_2$ ... $-b_n$.

The other end of each set of windings is connected to one input terminal of a phase sensitive impedance constructed as shown for FIGURE 1, the other input terminal being earthed. For example, the primary winding of the transformer, corresponding to that which has the secondary winding 1 shown in FIGURE 1, may be connected between the respective end of the set of windings and earth. Each phase sensitive impedance is arranged in order to prevent the voltages at the respective ends from going into the positive phase. The phase sensitive impedance in question are denoted in FIGURE 2 by the reference $PSI_1$, $PSI_2$ ... $PSI_n$. The linear function, which in the present example may be assumed to be a profit function is established in the device by means of a further set of windings on the cores $A_1$, $A_2$ ... $A_m$. These windings are denoted by the references $c_1$, $c_2$ ... $c_m$ and have numbers of turns representing the corresponding constants in Equation 2, the winding also having the appropriate senses. The left hand end of this series of windings is connected to the adjustable tap of an auto-transformer 23 having a voltmeter V1 connected across it as shown. The auto-transformer 23 may be on the same core as the auto-transformer 20 or on a separate core. The other end of the series of windings $c_1$, $c_2$ ... $c_m$ is connected to a switch SW whereby the said end can either be grounded or connected by a terminal 24 to a source of adjustable potential. In some cases the switch SW may be unnecessary in which case the respective end of the series of windings $c$ is earthed directly. On each of the cores, there is moreover a winding connected to a phase sensitive impedance, and these phase sensitive impedances are denoted by the references $PSI'_1$, $PSI'_2$ ... $PSI'_m$. Each of the impedances $PSI'_1$, $PSI'_2$ ... $PSI'_m$ is normally in the high impedance state when the flux variation in the respective core has the phase denoting a positive value of the respective attribute, but changes to the low impedance state if the flux tends to assume the negative phase thereby imposing the constraint on each attribute that it be either positive or zero. Further windings on the cores are connected to output terminals denoted by $S_1$, $S_2$ ... $S_m$ at which the A solutions to the problem can be obtained by voltage sampling. All these windings have the same sense and each has a number of turns representing unity on the scale of the apparatus.

When the device illustrated has been set up for the solution of the given problem, and the appropriate connections have been applied to the terminals $-b_1$, $-b_2$ etc., the solution is obtained by setting the tap on the auto-transformer 23 at the bottom end of the auto-transformer (as seen in the drawing) and then displacing the tap upwardly so that the amplitude of the current injected into the series of windings $c$ is increased progressively. The displacement of the tap may be effected by means of a servo drive in known manner or may be effected manually. Each set of windings, such as $a_{11}$, $a_{12}$ ... and the respective potential source and phase sensitive impedance constitute a circuit which represents the corresponding constraint and considering the circuit corresponding to the first constraint for purposes of illustration, so long as $a_{11}A_1 + a_{12}A_2 \ldots + a_{1m}A_m$ does not exceed $b_1$ the impedance $PSI_1$ remains a virtual open circuit. The windings $a_{11}$, $a_{12}$ ... $a_{1m}$ do not on that condition constrain the fluxes in the cores $A_1$, $A_2$ ... $A_m$. However, if the algebraic sum of the electro-motive forces induced in the windings $a_{11}$, $a_{12}$ ... $a_{1m}$ tends to exceed the potential $b_1$ the impedance $PSI_1$ changes to a virtual short circuit and the back electro-motive force corresponding to the resultant current flow in the windings counteracts the tendency. In this way a constraint is imposed on the fluxes in the cores $A_1$, $A_2$ ... $A_m$, and therefore on the attributes represented thereby in accordance with the first of the inequalities (1) set out above. The circuits including the other sets of windings $a_{21}$ ... $a_{2m}$, $a_{31}$ ... $a_{3m}$ and so on similarly impose constraints on the fluxes according to the other inequalities (1). The displacement of the tap on the auto-transformer 23 is continued until the voltage indicated on the voltmeter V1 suddenly drops to a relatively low value. This occurs when the number of the impedances PSI in the low impedance state is sufficient to determine the fluxes in the cores and the current in the windings $c_1$, $c_2$ ... $c_n$ tends to exceed the value which is compatible with these fluxes. The reading on the voltmeter just before the sudden drop occurs represents the maximum value measured in relation to the voltage across 20, which is liable to change as the tap on 23 is adjusted, and the tap on 23 is displaced a small distance backwards to restore this reading before determining the solutions to the problem.

The foregoing description of the operation is based on the assumption that $F=0$ is a condition which satisfies 1 and 2. If $F=0$ does not satisfy 1 and 2 inspection or experiment is required to find a value $F_0$ which does and a voltage equivalent to this value is then applied to the terminal 24, the switch SW being operated in the appropriate manner. Generally the circuit will settle with $m$ of the phase sensitive impedances PSI in the low impedance condition, although degeneracy in the problem would allow more than this number to come into operation.

The A solutions to the problem can be read off, when the tap on the transformer 23 is in the position giving the reading just prior to the drop in the reading on the voltmeter $V_1$, by means of a ratio box 25 fed by an amplifier 26, whereby the voltages at the terminals $S_1$, $S_2$ ... $S_m$ can be measured in terms of the voltage on $V_1$.

To verify that the solution obtained is correct, switch means may be provided for reducing the output impedance, or increasing the voltage, applied to the apparatus at the terminals 21. In that case if operation of said switch means produces no change in the ratio corresponding to F, the solution must be correct.

In many problems a large number of the constants $a$ will be zero. Therefore in order to reduce costs, each of the constants $a$ or individual groups of them, could be set up on a separate core, or core-set to save tappings, and those which should be on the same core coupled by tight couplings. This is illustrated by FIGURE 3 which shows two representative windings $a_{ij}$ and $a_{(i+1)j}$ on individual cores $A_{ij}$ and $A_{(i+1)j}$.

The windings $a_{ij}$ and $a_{(i+1)j}$ may correspond to any two windings on the same A-core in FIGURE 2. The cores $A_{ij}$ and $A_{(i+1)j}$ have additional windings on them, denoted by the references $d_{ij}$ and $d_{(i+1)j}$ these windings being connected in parallel so that fluxes in the cores $A_{ij}$ and $A_{(i+1)j}$ are caused to be identical or to bear some predetermined ratio one to another according to the ratio of the number of turns on $d_{ij}$ to the number of turns on $d_{(i+1)j}$. In this way the cores $A_{ij}$ and $A_{(i+1)j}$ are tightly coupled so that they will be equivalent to a single core and all the other cores for windings on the jth column are similarly coupled to produce the equivalent of the core $A_j$ of FIGURE 2. The windings $d$ may for example be tapped according to denary ratios so that the fluxes in one $j$ core, say $a_{ij}$ may be related to that in one or more other $j$ cores according to a power of 10. In this way a wider range of values of the constants $a$ may be set up with a given maximum number of turns on the cores $a_{1j}, a_{2j} \ldots$. For illustrative purposes, two taps whereby ratios of 10:1 or 1:1 may be selected are shown of each of the windings $d$ in FIGURE 3.

It is to be understood that where reference is made in the claim to a core corresponding to each attribute, the term "core" is intended to include either a single core as illustrated in FIGURE 2 or a set of cores tightly coupled so as to have the effect of a single core as illustrated in FIGURE 3.

What I claim is:

Apparatus for maximising a linear function of a set of attributes subject to a set of constraints greater in number than said attributes, comprising a set of magnetisable cores, one core for each attribute, a circuit representing said function and including a source of alternating voltage and inductive elements coupled in series one with another and with said source, said inductive elements having inductive linkages with respective cores which are adjusted in magnitude and sign in accordance with the magnitude and sign of the constants of said linear function, further circuits representing said constraints, each further circuit including a source of alternating voltage and inductive elements coupled in series one with another and with the respective source of alternating voltage, said inductive elements having inductive linkages with said cores which are adjusted in magnitude and sign in accordance with the magnitude and sign of constant terms of the respective constraints, each further circuit also including an impedance having a high impedance state for an applied alternating electro-motive force of one phase and having a low impedance state for an applied alternating electro-motive force of opposite phase, means being provided for determining fluxes in said cores corresponding to the maximum voltage across said first source and a winding inductively coupled to a single one of said cores and connected in series with an impedance which has a high impedance for an applied electro-motive force of one phase and has a low impedance for an applied electro-motive force of one phase and has a low impedance for an applied electro-motive force of the opposite phase, thereby to constrain the flux in said core to a desired phase if different from zero.

References Cited in the file of this patent
UNITED STATES PATENTS

| | | |
|---|---|---|
| 2,562,912 | Hawley | Aug. 7, 1951 |
| 2,871,375 | Early | Jan. 27, 1959 |

FOREIGN PATENTS

| | | |
|---|---|---|
| 389,524 | Great Britain | Mar. 20, 1933 |